(No Model.)

S. LEVIN.
Eyeglass.

No. 232,985. Patented Oct. 5, 1880.

WITNESSES:
W. W. Hollingsworth
Edw. W. Byrn

INVENTOR:
Samuel Levin
BY
ATTORNEYS.

UNITED STATES PATENT OFFICE.

SAMUEL LEVIN, OF PITTSBURG, PENNSYLVANIA, ASSIGNOR OF ONE-FOURTH OF HIS RIGHT TO NICHOLAS SNYDER, OF SAME PLACE.

EYEGLASS.

SPECIFICATION forming part of Letters Patent No. 232,985, dated October 5, 1880.

Application filed July 30, 1880. (No model.)

*To all whom it may concern:*

Be it known that I, SAMUEL LEVIN, of Pittsburg, in the county of Allegheny and State of Pennsylvania, have invented a new and useful Improvement in Eyeglasses; and I do hereby declare that the following is a full, clear, and exact description of the same, reference being had to the accompanying drawings, forming part of this specification, in which—

Figure 1:
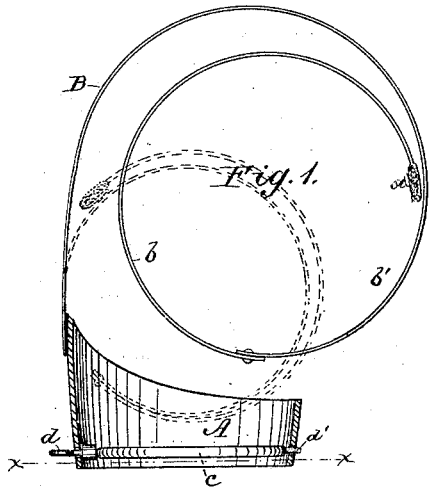
Figure 2:
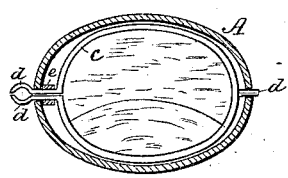
Figure 3:
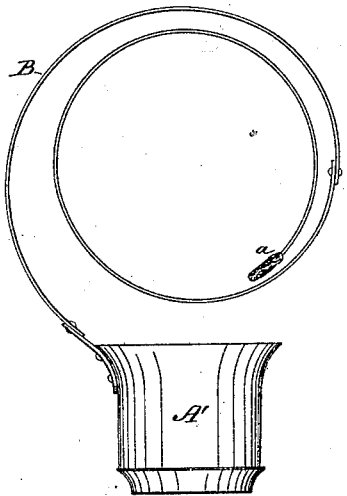
Figure 4:
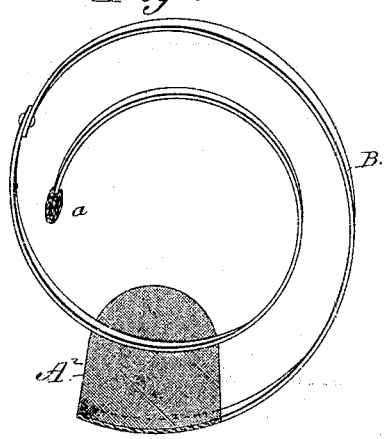

Figure 1 is a sectional view of a goggle-frame containing a reversible lens and having the sectional spring attached. Fig. 2 is a cross-section of Fig. 1 through the line $x$ $x$. Fig. 3 is a side view, showing my invention as applied to a watch-maker's eyeglass. Fig. 4 is a perspective view, showing the invention in the form of an eye-shade.

My invention relates to an improvement in eyeglasses which are employed upon one eye at a time—such, for instance, as watch-makers', lithographers', and engravers' glasses—and which improvement is applicable also to goggles, eye-shades, &c.

The improvement is designed to relieve the operator from the effort of holding his glass by the contraction of the muscles about the eye, and to avoid the use of bandages or ligature passing entirely around the head.

The invention consists in connecting with such glass, goggle, or shade a coil-spring which is adapted to pass part way around the head to hold the glass, and is provided with a cushion or pad at its extremity, which coil-spring is made in jointed sections, which permit it to be folded within a small compass.

The invention also consists in the detachable and reversible arrangement of the lens in the goggle-frame, as hereinafter more fully described.

In the drawings, A represents a goggle-frame carrying a lens, to which frame is rigidly attached the coil-spring B, being fastened by any suitable means. This spring is in the nature of a flat thin elastic band of metal, whose extremity is armed with a pad or cushion, $a$, to prevent it from sticking into the head of the wearer. This spring is designed to pass half-way or a little more than half-way around the head, and to hold the glass or shade before the eye with a light pressure. This spring may be applied to a goggle-frame, A, as in Figs. 1 and 2, or it may be connected to a watch-maker's eyeglass, A', as in Fig. 3, or it may be attached to an eye-shade, A², as shown in Fig. 4.

For easier portability this spring is made in two sections, $b$ $b'$, connected by a loose riveted joint, which permits one section of the spring to be turned around, so that its curvature may correspond to the curvature of the other section, as shown in dotted lines in Fig. 1, and in this position occupies very much less room, which adapts it to be carried in the pocket.

In adapting the lens of the goggle-frame to the wants of the operator I use that form of glass in which the upper portion is made for one focus and the lower half for another, to adapt the operator to examine objects close at hand or farther away, and this lens I mount in a frame, $c$, which is reversibly held in the outer edge of the goggle-frame. This reversibility of the lens is secured by stems $d$ $d'$ at the ends of frame $c$, which turn in bearings in the goggle-frame like trunnions. This reversing of the lens, it will be seen, turns the top of the glass where the bottom was, and adapts the device to be used for seeing a long distance down, the usual mode being to fix for the long distance one-half of the lens at the top and the short distance one-half at the bottom.

The frame $c$ is also so constructed that the lens may be taken out and another put in. For this purpose one of the stems, $d$, is split longitudinally through to the glass, and one half of it joins the upper curved part of the frame and the other half the lower curved part of the frame. Now when these two parts of the stem $d$ are separated the frame springs open and the lens comes out. When they are closed, however, to retain the lens, they are held together by a collar, $e$, which encompasses the two sections of the pin, and is soldered in place. In this position the extension of the stem-section $d$ forms one of the trunnion-bearings upon which the frame $c$ turns in the goggle-frame.

Having thus described my invention, what I claim as new is—

1. An eyeglass or its equivalent, as described, provided with a rigidly-attached coil-spring, made in sections adapted to fold, as described, for easier portability.

2. An eyeglass-frame or goggle-frame having a lens carried by an independent frame, made reversible in said outer frame, for the purpose described.

SAMUEL LEVIN.

Witnesses:
K. L. DUDLEY,
B. McKENNA.